United States Patent [19]

Restelli

[11] Patent Number: 4,669,581
[45] Date of Patent: Jun. 2, 1987

[54] BRAKE FOR A BICYCLE WHEEL WITH OPPOSED FRICTION BLOCK LEVERS DISPOSED TANGENTIALLY TO THE WHEEL

[75] Inventor: Amedeo A. Restelli, Cernusco Lombardone, Italy

[73] Assignee: Societá Italiana Catene Calibrate Regina S.p.A., Milan, Italy

[21] Appl. No.: 760,457

[22] Filed: Jul. 30, 1985

[30] Foreign Application Priority Data

Aug. 13, 1984 [IT] Italy ............................. 22319 A/84

[51] Int. Cl.[4] ............................................. B62L 1/14
[52] U.S. Cl. ................................................. 188/24.12
[58] Field of Search ............... 188/24.11, 24.12, 24.14, 188/24.15, 24.16

[56] References Cited

FOREIGN PATENT DOCUMENTS

| 935044 | 6/1948 | France | 188/24.12 |
| 935317 | 6/1948 | France | 188/24.14 |
| 476765 | 12/1937 | United Kingdom | 188/24.12 |
| 662787 | 12/1951 | United Kingdom | 188/24.12 |

Primary Examiner—Duane A. Reger
Attorney, Agent, or Firm—Stevens, Davis, Miller & Mosher

[57] ABSTRACT

A bicycle wheel brake consisting of a pair of opposed friction blocks carried by respective levers pivoted, either directly or through a support, to the bicycle frame, so as to be controllable against the action of spring members to lock the blocks against the wheel rim. Each lever is pivoted at one side of the wheel so as to move on a plane substantially parallel to the plane tangential to the wheel.

5 Claims, 6 Drawing Figures

BRAKE FOR A BICYCLE WHEEL WITH OPPOSED FRICTION BLOCK LEVERS DISPOSED TANGENTIALLY TO THE WHEEL

Brakes for bicycles—particularly racing bicycles—are known which consist of a pair of opposed friction blocks which can be controlled to lock against the wheel rim. The blocks are rigidly fixed to a caliper the levers of which are pivoted to the fork or the frame of the bicycle, by means of a central pin, so as to move on a radial plane of the wheel.

The said levers extend beyond the central pin from the part opposite the extremities which carry the blocks, and a Bowden cable within a guide is secured to such extensions. The Bowden cable, when operated, closes the caliper against the action of counter spring, usually of the wire type, acting between the said two levers.

Brakes having the above described general structure entail various problems which have not thus far been fully solved.

Firstly, when stressed, i.e. when the brakes are applied, they are not sufficiently rigid on account of the structure and disposition of the caliper and the friction blocks. More specifically, the lack of rigidity is due to the co-existence of the clearance which must perforce exist between the levers and their pin and the disposition of such levers on a plane transversal to the bicycle wheel.

In consequence, when the brakes are applied, the stresses transmitted to the caliper flexurally stress the levers and their pivoting to the frame.

To achieve a good degree of resistance and rigidity of the brake caliper, the flexurally operating levers must be made of material adequate for the purpose, with a section such as well lends itself to resist such kind of stress.

The pivoting of the levers must also be of sturdy configuration, since such pivoting is subject to a fairly high defectling torque.

The length of the two arms of the caliper cannot in fact be reduced beyond the limit necessary for them, overreaching the height of the tire, to bring the friction blocks proximal to the lateral fascias of the rim. It is, moreover, evident that much friction is caused to pivoting arrangements subject to flexural stress, and this impedes the manually-applied closure of the caliper, which becomes stiff and not readily modulated.

Another keenly felt problem relating to brakes of the type described above is the elevated aerodynamic resistance they offer when the bicycle is in motion, as a result of the sizing the different parts have to be given in order to resist the aforesaid stresses.

The aerodynamic resistance factor is not a negligible one, given that in bicycles, especially racing bicycles, each component is required to assure the maximum aerodynamic penetration.

A last but not least difficulty is abnormal (irregular) wear of the fixed friction blocks caused by errors of parallelism between these and the rim, both during mounting and owing to the elastic deformation of the brake during use.

The principal object of the present invention is to solve the above-mentioned technical problems by embodying a brake having a structure which causes minimal torsional and flexural stresses to the components, so as to prove rigid and easily operated without calling for excessive manually applied force.

Another object of the invention is to embody a brake having improved aerodynamic penetration.

A further object of the invention is to embody such a brake for fixing to the bicycle frame in the same place as a traditional brake is fixed, so as to be mountable if necessary without any local modifications thereto.

These objects are attained according to the invention by bicycle wheel brake comprising a pair of opposed friction blocks carried by respective levers pivoted to the bicycle frame and controllable against the action of elastic spring means to lock against the wheel rim, characterized in that said levers are each pivoted at one side of the wheel so as to move on a plane substantially parallel to the plane tangential to the wheel itself.

The said friction blocks are preferably mounted on the respective levers in an oscillating manner, by means of pins parallel to the articulation pins of levers. The structural and functional characteristics of the invention, and its advantages over the known art, will be more apparent from an examination of the following description with reference to the appended drawings showing two possible forms of practical embodiment of the invention.

Figure 1:
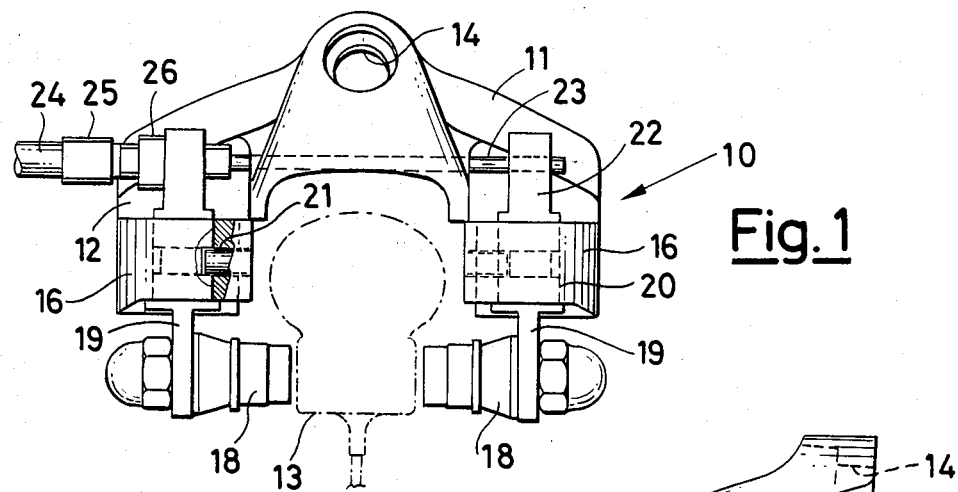
FIG. 1 is a front elevation, partially sectioned, illustrating a brake embodied according to the principles of the invention.
Figure 3:
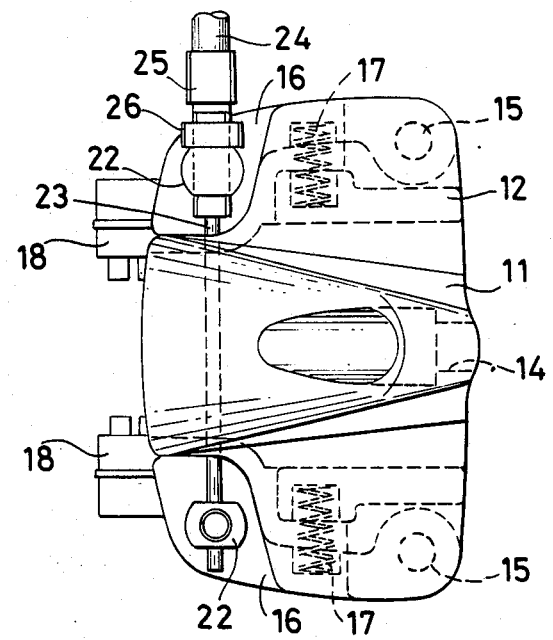
FIG. 3 is a plan view.

With reference firstly to the FIGS. 1 and 3 of the drawings, the bicycle wheel brake according to the invention therein shown is indicated overall by 10, and consists structurally of a support body 11 preferably having an aerodynamic form such as offers negligible air-resistance. To such end, the body 11 can advantageously have a general "C"-shaped configuration, with the wings 12 interconnected so as to give an aerodynamic profile. The support 11 is centrally traversed by a bore 14 adapted to receive a means for securing the brake to the bicycle frame.

Characteristically, there are pivoted to the wings 12 of the body 11, by pins 15, respective levers 16 oscillating against the action of a counter spring 17 acting between them and the body 11. At the free end of levers 16 there is also mounted, through block holders 19, a pair of friction blocks 18 facing the rim of the wheel 13, which rim is shown by dash-and-dot lines in FIG. 1.

The block holders 19 are pivoted to the levers 16 by pins 20 parallel to the pins 15 restrained in place axially by radial dowels 21. The pins 20 protrude upwardly from the levers 16 with respective tangs 22 which are operatively interconnected for the actuation of the brake by means of a traditional Bowden cable 23, cable guide 24, adjusting screw 25 and nut 26. Worthy of note is the concealed disposition of the cable 23, which passes through the body 11.

Figure 2:
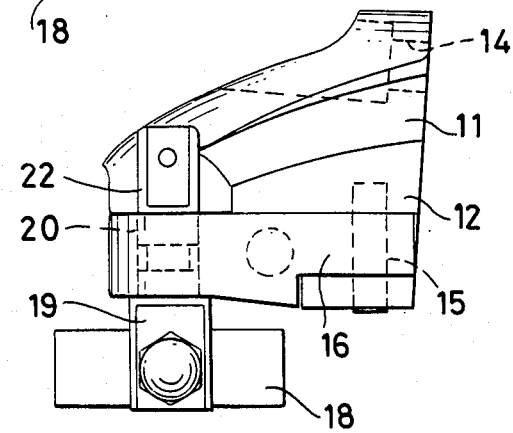
FIG. 2 is a side elevation, partially sectioned, illustrating the same brake as a FIG. 1.
Figure 4:
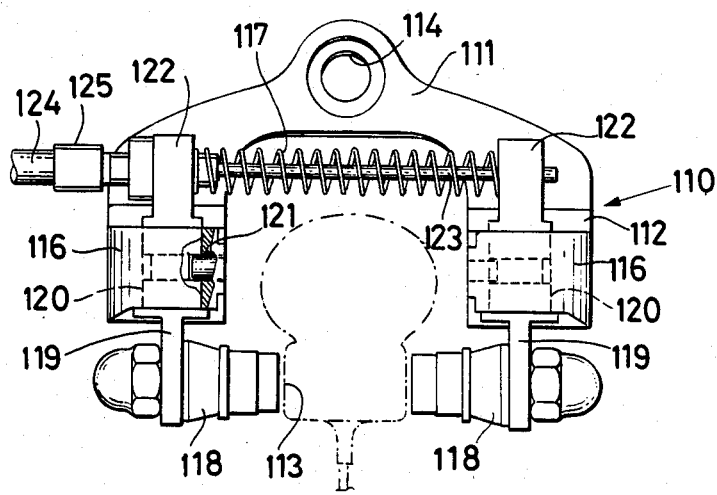
FIGS. 4, 5 and 6 are views the same as the previous views but illustrating another possible form of embodiment of the invention.
Figure 5:
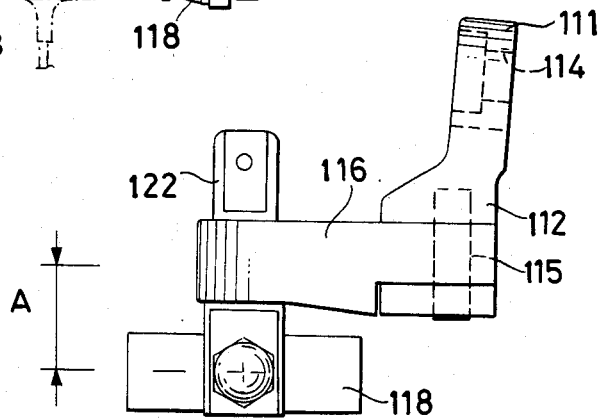
Figure 6:
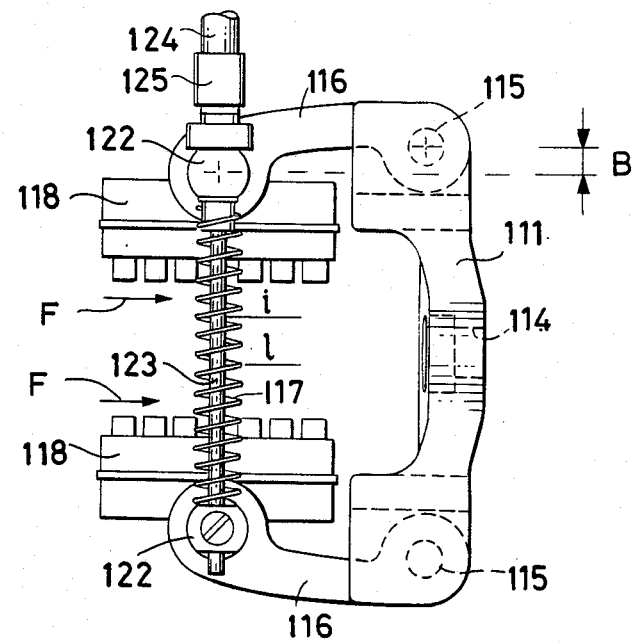

FIGS. 4, 5 and 6 show another possible form of embodiment of the invention which is conceptually identical to that described above with reference to FIGS. 1, 2 and 3, and in which the identical or equivalent parts are indicated by the same reference numerals.

The brake shown in FIGS. 4, 5 and 6 differs from the first described brake only in point of simplification of configuration of the components, less attention being paid to the connections between the parts as regards their aerodynamic penetration.

The body 111 is in effect a simple "C" and the levers 116 are countered by an unconcealed single spring 117 mounted on the cable 123 which acts directly between the tangs 122 of the articulation pins 20.

The advantages of the brake according to the invention are apparent from what has been described heretofore with reference to the Figures.

The great rigidity of the structure under stress will prove particularly clear, such rigidity being due to the possibility of stably fixing the support body 11 to the frame or fork of the bicycle and also due to the disposition of the levers 16 in a plane tangential to the wheel, so that the levers 16 are chiefly stressed by traction or compression. There needs to be noted the minimal arm indicated by A existing between the friction blocks and the lever articulation pins, whereby the levers and the pins undergo only moderate flexural and torsional stress.

The fact that the pins of the linkage levers work chiefly shear-wise prevents the occurence of friction and jibbing such as impede the manual operation of the brake, and thus braking is easily modulated and calls for no excessive effort.

With the brake according to the invention, moreover, it is possible to obtain a self-braking action, when the brake is mounted according to an appropriate orientation. This can be seen from FIG. 6: if the leverage configuration is such that, when the blocks rests on the wheel rim, the pin 120 is of smaller (by a value shown as B) radial distance than the pin 115, and the mounting orientation of the brake is such that the braking action brings about a force F on the block, there is induced a corresponding moment on the levers 116, about the pin 120, which thrusts the brake to closure. A suitable sizing of the value B permits the desired extent of self-braking effect that facilitates manual operation of the brake.

Additionally, the free-float mounting of the blocks on the levers allows the former to self-adapt perfectly to the rim, which means that wear of the friction material is uniform and that thus there ia an even distribution of stresses.

To this end, the axis of the pin 120 can lie outside the median geometrical plane of the block so that, when braking is applied, the pressure of the different zones on the rim is averagely uniform.

As the brake is characterized by the fact that the levers move on a plane substantially parallel to the plane tangential to the wheel, it is evident that the configuration of the brake can have numerous other variants of realization over and above those heretofore illustrated, so as to prove adapted to the specific end-use involved, according as more importance attaches to simplicity, economic considerations, etc., without for such reason falling outside the scope of the present invention.

I claim:

1. A bicycle wheel brake comprising an elongated support body of length to transgress the width of the wheel and mountable on a bicycle frame member, wings extending downwardly from said body to be positionable on either side of said wheel, a pin vertically mounted on each wing, a lever pivotally mounted on each pin to move only in a plane parallel to the closest tangential plane of the wheel, as oscillatable pin mounted on each lever parallel to the pin mounted on the wing, friction blocks mounted on one end of said oscillatable pin to frictionally engage the wheel rim when braking, a transverse orifice through the other end of each of said oscillatable pins, a cable mounted within the orifice of each oscillatable pin, cable guide means which together with the cable when exercized bias the friction blocks against the wheel rim, and means to bias the friction blocks away from said wheel rim when said cable is not being exercized.

2. The bicycle wheel brake of claim 1 wherein said means to bias the friction blocks away from said wheel rim constitutes a spring mounted around said cable between said oscillatable pins.

3. The bicycle wheel brake of claim 1 wherein said means to bias the friction blocks away from said wheel constitutes two springs, each spring being mounted between said wing and said lever.

4. The bicycle wheel brake of claim 1 wherein said oscillatable pins are spaced a distance apart less than the distance between the pins mounted in the wings.

5. The bicycle wheel brake of claim 1 wherein said support body extends between said oscillatable pins and said cable passes through said support body extending between said pins.

* * * * *